United States Patent Office 3,551,404
Patented Dec. 29, 1970

3,551,404
PROCESS FOR REMOVING COLOR AND ODOR IN TALL OIL ROSIN
Gerald S. Watkins, Jr., Apalachicola, Fla., assignor to SCM Corporation, Cleveland, Ohio, a corporation of New York
No Drawing. Filed Apr. 8, 1968, Ser. No. 719,703
Int. Cl. C09f 1/02
U.S. Cl. 260—97.6         1 Claim

ABSTRACT OF THE DISCLOSURE

This invention sets forth a method of improving the color and odor in tall oil rosin. More specifically, it contemplates heating distilled tall oil rosin at a temperature sufficiently high and for a period long enough to convert the odor and color bodies contained therein to relatively nondistillable compounds or heavy ends.

Heavy ends obtained on heating the distilled tall oil rosin are then separated from the rosin fraction, usually by distillation. The resultant final distillate cut contains a substantially odorless and colorless tall oil rosin while the residue consists essentially of the converted color and oder bodies in the form of heavy ends.

---

As is well known in the art, tall oil rosin is one of the constituents of crude tall oil; crude tall oil being a by-product from the sulfate process in the manufacture of paper. Although crude tall oil contains various impurities and sterols, about 90% is essentially tall oil rosin acids and fatty acids. Commercially, the tall oil rosin acids are separated from the crude tall oil by distillation and the product is known as distilled tall oil rosin. Even though distilled tall oil rosin may have improved color and odor over that of crude tall oil, it too contains the offensive properties characteristic to crude tall oil and is, therefore, not useful for some commercial applications.

The prior art is replete with methods for improving the color and odor in tall oil rosin. One of the basic methods has been to heat crude tall oil and distill. More specifically, the basic method comprises heating crude tall oil to a temperature of about 225° C. to about 300° C. for about 1 to 15 hours. When heated under these conditions, the color and odor bodies contained in the crude tall oil are converted into compounds which are relatively non-distillable or heavy ends. These heavy ends are then separated from heat-treated crude tall oil by distillation.

Various additives, such as the phosphates, halogens and borates have been added during the heating step to facilitate the conversion of the color and odor bodies into heavy ends, but even where they have been employed, some color and odor are carried over into the final tall oil rosin product.

It is a primary object of the invention to reduce the color and odor that is normally present in tall oil rosin. My invention uses a completely new approach to the problem of obtaining a substantially odor and color free tall oil rosin. More specifically, it contemplates heat-treating a tall oil rosin acid fraction such as distilled tall oil rosin and not crude tall oil. Apparently, some of the fatty acids, pitchfraction, impurities, and sterols that are present in crude tall oil and not present in distilled tall oil rosin interfere with the conversion of the color and odor bodies into heavy ends. As a result of this unobvious and important discovery i.e. using distilled tall oil rosin instead of crude tall oil, I can produce a final tall oil rosin product that has very little color and odor. As a first step of the invention, a tall oil rosin acid fraction is obtained. Usually this is accomplished by distillation of crude tall oil. As a second step, the tall oil rosin acids fraction is heated to a sufficient temperature and for sufficient time to convert a substantial proportion of the color and odor bodies contained therin into heavy ends. As a third step, the heavy ends are separated from the heated rosin acids fraction. This separation is usually accomplished by distillation.

In practicing the invention, the first step is to obtain a substantially free tall oil rosin acids fraction. Preferably, this is done by distilling crude tall oil into its fractions; namely, pitch, rosin, and fatty acids fraction. Usually this separation is accomplished by a two-stage distillation. The faty acids and rosin acids constitute the distillate cut from the first distillation. This distillate cut is then distilled and the rosin acids are recovered as the bottoms fraction; the fatty acids constitute the distillate cut. The prior art showed heat treating crude tall oil and as a result, only a portion of the color and odor bodies are converted to heavy ends. The invention is to heat treat a distilled tall oil rosin acids fraction instead of crude tall oil. As previously stated, the extraneous material in crude tall oil interferes with the conversion of the color and odor bodies. It is desired for best results to keep the rosin acids substantially free of the fatty acids and other impurities during heating. By substantially free, I mean less than 10% by weight of the rosin product. It is important to note that the manner in which the tall oil rosin acids fraction is obtained is not important. The problem is to convert substantially all of the color and odor bodies to a form, such as heavy ends, so they can be separated from the rosin fraction. Hence, only a few color and odor bodies can be carried over into the product.

As a second step, the tall oil rosin acids fraction obtained from the first step is heated. The purpose of this heating step is to convert the color and odor bodies into a form that can be easily separated from the rosin acids fraction. The compounds which impart the color and odor to the rosin fraction and to crude tall oil are referred to as color and odor bodies. The odor bodies have a distinct smell of mercaptans and other sulphur compounds. The color bodies have not been analyzed for composition, but they definitely impart a dark to blackish appearance to crude tall oil and to the rosin acids fraction.

When heated, the color and odor bodies convert to heavy ends, which have substantially lower volatility than tall oil rosin acids. By having substantially lower volatility, I means that the vapor pressure of the heavy ends is substantially less than tall oil rosins at the same temperature. For example, the heavy ends do not come off as a substantial heads fraction when the temperature is raised during the distillation to about 350° C. The rosin acids usually come off at a temperature of from about 200 to 280° C. at a pressure of 1–10 mm. mercury.

The heating is conducted for a sufficient time and at a sufficient temperature to convert a substantial proportion of the color and odor bodies into heavy ends. In this invention, the time, temperature parameters of the heating stage are inversely proportional to each other. For example, if the rosin acids fraction is heated at a temperature of 200° C., a time period of 20 hours may be required, whereas when heating at a temperature of about 300° C., a time period of 1 to 3 hours is required. The key to the heating cycle is that it converts a sufficient amount of the color and odor bodies into heavy ends so that only a small amount of these bodies will be carried into the rosin acids fraction. Hence, on separation, the rosin acids will have very little odor and very little color. The preferred conditions for the heating cycle are from about 260° to 300° C. and for a time of 1 to 4 hours.

When heating the tall oil rosin acids as described in the second step, it is preferred to keep the charge in a substantially inert environment. By a substantially inert environment, it is meant that the surrounding atmosphere is substantially free of oxygen or other reactive gas. As is well known in the art, oxygen has a tendency to react with the tail oil rosin acids to yield products which impart a darker color to the rosin. Other compounds or impurities can also react with tall oil rosin to produce an inferior product. To avoid these problems, it is much easier to purge the system with nitrogen gas and maintain the inert environment.

As a third step, the rosin acids are separated from the converted color and odor bodies or heavy ends. Preferably, this is done by distilling at a temperature of about 200 to 280° C. and at a pressure of 1 to 10 mm. mercury. The tall oil rosin acids fraction having reduced color and odor is recovered as the distillate cut. The heavy ends comprise the converted odor and color bodies and are recovered on the bottoms cut. Usually, the bottoms cut is from 5–12% by weight of the charge.

The following examples are provided to illustrate the preferred method of practicing the invention and are not intended to restrict the scope thereof. All parts are parts by weight uness otherwise specified.

EXAMPLE 1

Crude tall oil was dried and vacuum distilled, separating the rosin, fatty acid and pitch fractions. The distilled tall oil rosin obtained was analyzed for color, odor, and acid number. This rosin acid fraction was heated in a vessel and slowly agitated. A nitrogen gas blanket was maintained in the vessel. On completion of the heat treatment, the rosin was vacuumed, distilled and the distillate containing the rosin was evaluated. The results were as follows:

|  | G-H Color | Odor | Acid No. | Residue, percent |
|---|---|---|---|---|
| DTOR | 8–9 | Very strong | 174.7 |  |
| HT Distilled Tall Oil Rosin at 215° C. for 18 hrs | 5 | Slight | 181.0 | 5.4 |

In the above and following examples, these terms will be understood to mean the following:

(1) DTOR will refer to the Distilled Tall Oil Rosin acids fraction obtained from the separation of the crude tall oil and charged to the flask.

(2) HT Distilled Tall Oil Rosin will refer to the heat treated distilled tall oil rosin fraction that has been subsequently distilled and the heavy ends removed therefrom.

(3) G-H Color refers to the Gardner Hellige 1933 Standard Color Scale.

(4) Residue refers to the residue left after separating the rosin acids fraction and is given as percent of the weight charge DTOR.

EXAMPLE 2

The same procedure was followed as described in Example 1 except that a somewhat different condition of heat treatment was used as indicated.

|  | G-H Color | Odor | Acid No. | Residue, percent |
|---|---|---|---|---|
| DTOR | 8–9 | Very strong | 174.7 |  |
| HT Distilled Tall Oil Rosin at 250° C. for 20 hrs | 3 | None | 170.8 | 12.2 |

EXAMPLE 3

The same procedure was followed as described in Example 1 except that a somewhat different condition of heat treatment was used as indicated.

|  | G-H Color | Odor | Acid No. | Residue, percent |
|---|---|---|---|---|
| DTOR | 8–9 | Very strong | 174.7 |  |
| HT Distilled Tall Oil Rosin at 280° C. for 1 hr | 4 | Very slight | 177.5 | 6.4 |

EXAMPLE 4

The same procedure was followed as described in Example 1 except that a somewhat different condition of heat treatment was used as indicated.

|  | G-H Color | Odor | Acid No. | Residue, percent |
|---|---|---|---|---|
| DTOR | 8–9 | Very strong | 174.3 |  |
| HT Distilled Tall Oil Rosin at 280° C. for 1½ hours | 4 | None | 177.7 | 6.4 |

EXAMPLE 5

The same procedure was followed as described in Example 1 except that a somewhat different condition of heat treatment was used as indicated.

|  | G-H Color | Odor | Acid No. | Residue, percent |
|---|---|---|---|---|
| DTOR | 8–9 | Very strong | 174.3 |  |
| HT Distilled Tall Oil Rosin at 280° C. for 3 hrs | 3–4 | None | 174.5 | 8.5 |

EXAMPLE 6

Crude tall oil was heat treated at 280° C. for 2 hours and distilled to remove the rosin acids fraction. A like portion of crude tall oil was first distilled removing the tall oil rosin acids fraction. This tall oil rosin acids fraction was heated at 280° C. for 2 hours and distilled.

Hereinafter, HT Crude Tall Oil refers to heat treated crude tall oil that has been distilled and the rosin acids fraction removed.

|  | G-H Color | Odor | Acid No. | Residue, percent, |
|---|---|---|---|---|
| Charge Crude Tall Oil | 17–18 | Very strong | 166.2 |  |
| HT Crude Tall Oil at 280° C. for 2 hrs | 7 | Strong/moderate | 177.4 | 20.4 |
| HT Distilled Tall Oil Rosin at 280° C. for 2 hours | 4 | None | 177.4 | 6.58 |

Thus the above table shows the importance of separating crude tall oil into its fractions. When separated and treated according to this invention, a product having no odor and a color of 4 was obtained, as compared to a rosin product having a strong to moderate odor and a color of 7 obtained from the heating of crude tall oil.

EXAMPLE 7

Crude tall oil was separated in the manner set forth in Example 7. The distilled tall oil rosin fraction was heated in the presence of 0.03% of iodine by weight of charge.

|  | G-H Color | Odor | Residue, percent |
|---|---|---|---|
| DTOR | 8–9 | Very strong |  |
| HT Distilled Tall Oil Rosin with 0.03% I₂ at 235° C. for 2 hrs | 4 | Very slight/none | 4.2 |

EXAMPLE 8

Crude tall oil was vacuum distilled separating the whole distilled tall oil (WDTO) and pitch fraction. The whole distilled tall oil (WDTO) containing about 50 parts fatty acid and 50 parts rosin acid was heated at 270° C. for 3 hours. This heated mixture was distilled and the distillate cut separated into a distilled tall oil rosin acids fraction and fatty acids fraction. The results are as follows:

|  | Fatty acid G-H Color | Fatty acid odor | Rosin G-H Color | Rosin odor | Residue, percent |
|---|---|---|---|---|---|
| Charge fractions | 8 | Very strong | 9 | Very strong | 4.5 |
| IIT Distilled Tall Oil Rosin and fatty acids 270° C. for 3 hours | 3 | Very slight | 5 | Very slight | 12.5 |

From the foregoing one can understand that the critical comparatively long (generally at least about an hour and preferably considerably longer) heat treating step of this invention basically involves the aforedefined heating of the tall oil rosin acids fraction at least out of the presence of any tall oil pitch-providing fraction (undistillable residue), and preferably for special and surprising effectiveness and economy, out of the presence also of any appreciable tall oil fatty acid fraction (including the so-called "heads" cut). Additionally, one can understand that the presence of small amounts of conventional gum rosin and crude tall oil treating agents (e.g. iodine, boron oxides, phosphorus compounds, etc.) are permissible in my heat treatment of the tall oil rosin fraction (providing they do not interfere or detract substantially from getting the good color and odor results), although these are not necessary for obtaining tall oil rosin having excellent color and very low odor. Iodine, for example, has been used to disproportionate rosin in brief, high temperature treatments.

What is claimed is:
1. A process for producing a tall oil rosin having reduced color and odor which comprises the steps of:
  (a) distilling crude tall oil, removing as the distillate a whole distilled tall oil fraction, and as the bottoms, a pitch fraction;
  (b) fractionally distilling said whole distilled tall oil fraction into at least a tall oil rosin fraction containing less than 10% fatty acids;
  (c) heat treating said tall oil rosin fraction in a substantially inert environment at a temperature of between 200°–300° C. for a period of time of from 1–20 hours; and
  (d) distilling said heat treated tall oil rosin and recovering a tall oil rosin having reduced color and odor as the distillate.

References Cited

UNITED STATES PATENTS

| 2,441,198 | 5/1948 | Babayan | 260—97.6 |
| 2,716,630 | 8/1955 | Spangenberg et al. | 260—97.6 |
| 2,794,017 | 5/1957 | Palmer et al. | 260—97.6 |
| 3,377,333 | 4/1968 | Ciesielski et al. | 260—97.6 |
| 2,374,700 | 5/1945 | Pollak et al. | 260—97.7 |
| 2,515,739 | 7/1950 | Smerechniak et al. | 260—97.7 |

OTHER REFERENCES

Harris, G. C.: "Encyclopedia of Chemical Technology," December 1953 (p. 781 relied on).

HOSEA, E. TAYLOR, Primary Examiner
W. E. PARKER, Assistant Examiner

U.S. Cl. X.R.
261—97.7